United States Patent
Reubelt et al.

[11] Patent Number: 5,967,674
[45] Date of Patent: Oct. 19, 1999

[54] SELECTIVE WASHER AND THRUST BEARING ASSEMBLY

[76] Inventors: Leo M. Reubelt, 451 Harwinton Ave. Apt. 2b5, Torrington, Conn. 06790; Matthew G. Urmaza, 95 Honey Hill Rd., New Hartford, Conn. 06057

[21] Appl. No.: 09/115,927

[22] Filed: Jul. 15, 1998

[51] Int. Cl.⁶ ................................. F16C 19/30
[52] U.S. Cl. ........................................... 384/620
[58] Field of Search .................... 384/620, 622, 384/618, 609, 615, 617

[56] References Cited

U.S. PATENT DOCUMENTS

| | | | |
|---|---|---|---|
| 3,957,325 | 5/1976 | Babb | 384/622 |
| 3,999,816 | 12/1976 | Pitner | 384/620 |
| 4,225,200 | 9/1980 | Dougall | 384/621 |
| 4,310,205 | 1/1982 | Condon, Jr. et al. | 384/620 |
| 4,733,979 | 3/1988 | Tsuruki | 384/620 |
| 4,883,374 | 11/1989 | Rhoads et al. | 384/618 |
| 4,907,899 | 3/1990 | Rhoads | 384/620 |
| 4,910,847 | 3/1990 | Christenson et al. | 384/622 X |
| 4,915,512 | 4/1990 | Hilby et al. | 384/622 X |
| 4,981,373 | 1/1991 | Bando | 384/620 |
| 5,110,223 | 5/1992 | Koch et al. | 384/620 |
| 5,474,390 | 12/1995 | Rhoads | 384/623 |
| 5,489,255 | 2/1996 | Hinckley et al. | 384/620 |
| 5,529,400 | 6/1996 | Polinsky et al. | 384/620 X |
| 5,647,675 | 7/1997 | Metten et al. | 384/620 |

*Primary Examiner*—Thomas R. Hannon
*Attorney, Agent, or Firm*—John C. Bigler

[57] ABSTRACT

A thrust bearing assembly has inner and outer races having radially directed portions with a free outer edge. A selective washer is positioned over the free edge of one of the outer and inner races, the selective washer being engageable with that race to retain the selective washer to the thrust bearing assembly. Rolling elements are positioned between the inner race and the outer race and are retained within a bearing retainer. Axially inwardly extending flanges of the inner and outer races locate and retain the outer and inner races and the bearing retainer together as a thrust bearing assembly.

10 Claims, 3 Drawing Sheets

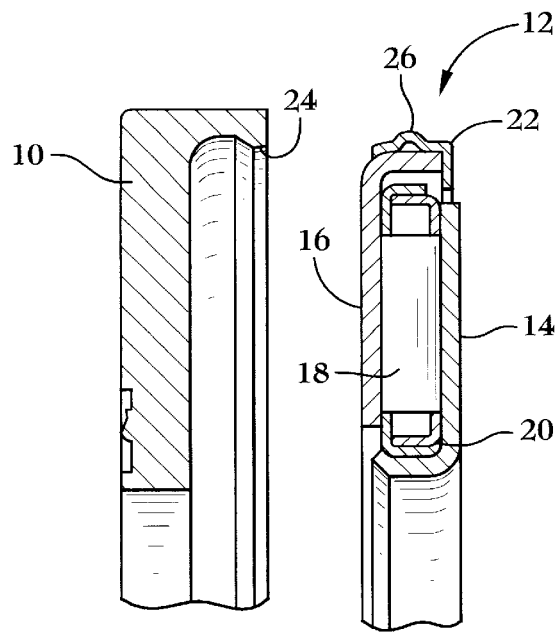
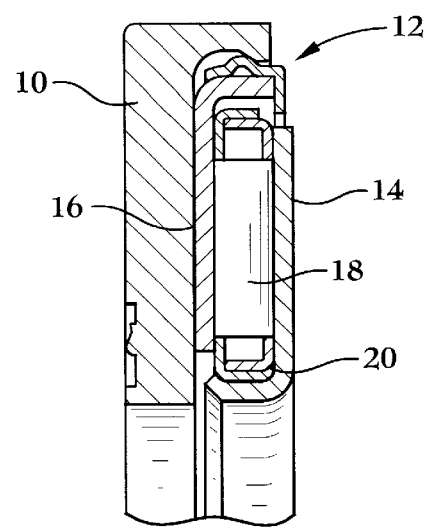
Fig. 1 (Prior Art)
Fig. 2 (Prior Art)
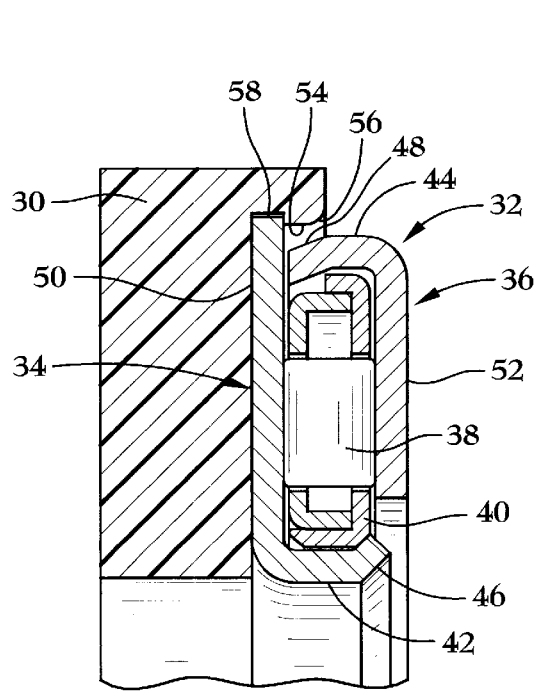
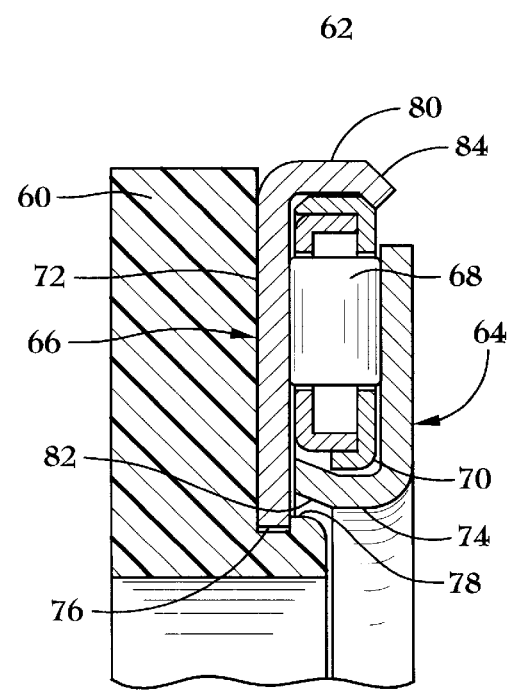
Fig. 3
Fig. 4 ately 5,967,674

SELECTIVE WASHER AND THRUST BEARING ASSEMBLY

BACKGROUND OF THE INVENTION

This invention relates generally to a thrust bearing assembly joined to a selective washer, and more particularly to the retention mechanism holding the selective washer and the thrust bearing assembly together. The term "selective washer" refers to a washer selected to provide a shim of a predetermined thickness.

A current method to join a plastic selective washer to a thrust bearing assembly employs a dimpled outer cup mounted over the outer race to provide a radially outwardly extending bump or rib. The selective washer is then snapped over the bump or rib to allow the thrust bearing and selective washer to be handled as a unit. This method works well; however, the dimpled outer cup adds to the complexity and cost of the bearing assembly. Significantly, that current configuration allows the selective washer to be mounted on the dimpled outer cup from either direction. To reduce the chance that the selective washer is installed backwards, the thrust bearing is marked with a colored identification stripe or other identification mark. The stripe, however, adds to the cost of the bearing assembly and does not ensure positively that the selective washer will always be installed correctly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a selective washer and thrust bearing assembly comprising an inner race having a radially directed portion with a free outer edge and an axially inwardly extending flange at a radially inner edge and an outer race having a radially directed portion with a free inner edge and an axially inwardly extending flange at a radially outer edge. Rolling elements are positioned between the inner race and the outer race and are retained within a bearing retainer. Retention means on the flanges of the outer race and the inner race holds the outer and inner races and the bearing retainer together as a thrust bearing assembly. A selective washer is positioned over the free edge of one of the outer and inner races, the selective washer being engageable with said one race to retain the selective washer to the thrust bearing assembly.

The foregoing and other aspects will become apparent from the following detailed description of the invention when considered in conjunction with the accompanying drawing figures.

BRIEF DESCRIPTION OF THE DRAWING FIGURES

FIG. 1 is a sectional viewed a prior art selective washer and thrust bearing assembly prior to mounting of the selective washer;

FIG. 2 is a sectional view of the prior art selective washer and thrust bearing assembly of FIG. 1 after mounting of the selective washer;

FIG. 3 is a sectional view of a selective washer and thrust bearing assembly illustrating a first embodiment of the present invention;

FIG. 4 is a sectional view of a selective washer and thrust bearing assembly illustrating a second embodiment of the present invention;

DETAILED DESCRIPTION

Figure 5:
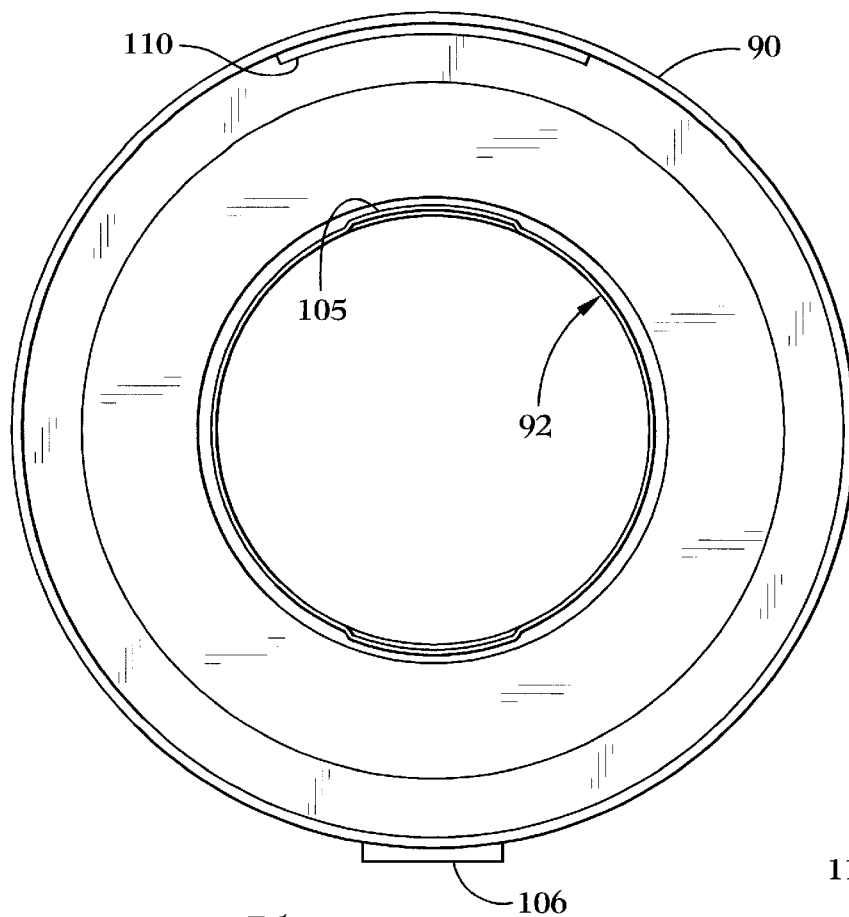
FIG. 5 is an end view of a selective washer and thrust bearing assembly illustrating a third embodiment of the present invention.

Referring now to the drawings, FIG. 1 illustrates a prior art selective washer 10 and thrust bearing assembly 12 prior to mounting of the selective washer. Thrust bearing assembly 12 includes inner race 14, outer race 16, rollers 18, bearing retainer 20, and dimpled outer cup 22. Circumferential lip 24 of selective washer 10 engages radially outwardly extending bump or rib 26 of dimpled outer cup 22 to hold selective washer 10 over thrust bearing assembly 12, as illustrated in FIG. 2.

As illustrated in FIG. 3, one embodiment of the present invention comprises selective washer 30 and thrust bearing assembly 32, shown with the selective washer mounted over the thrust bearing assembly. Thrust bearing assembly 32 includes inner race 34, outer race 36, rolling elements or rollers 38, and cage or bearing retainer 40. Selective washer 30 may be made of a polymer, such as for example polyetheretherketone (PEEK), or polyphthalamide. Inner and outer races 34 and 36 have axially inwardly extending flanges 42 and 44, respectively, with dimples, curled portions or lips 46 and 48 directed toward bearing retainer 40 to engage bearing retainer 40 and hold the elements of thrust bearing assembly 32 together for handling as an assembly, without restricting free relative rotation of bearing retainer 40.

Significantly, the present invention requires no dimpled outer cup. Inner and outer races 34 and 36 have radially directed portions 50 and 52 extending from the axially outward end of flanges 42 and 44, respectively. In this embodiment, radially directed portion 50 of inner race 34 extends radially outward of axially inwardly extending flange 44 to allow engagement with selective washer 30. This engagement may be a snap-together fit within a circumferential radially inwardly extending flange 54. A beveled or rounded edge 56 of flange 54 causes selective washer 30 to deflect radially outwardly over free outer edge 58 of inner race 34 until free outer edge 58 is positioned in a circumferential groove of selective washer 30, as shown.

FIG. 4 illustrates a second embodiment of the present invention comprising selective washer 60 and thrust bearing assembly 62 having inner race 64, outer race 66, rollers 68 and cage or bearing retainer 70. In this embodiment, radially directed portion 72 of outer race 66 extends radially inwardly beyond axially inwardly extending flange 74 of inner race 64 such that free edge 76 is secured by radially inwardly directed circumferential flange 78 and mates with a groove within selective washer 60. As in the first embodiment, axially inwardly extending flanges 74 and 80 have dimples or lips 82 and 84 directed toward bearing retainer 70 to hold the elements of thrust bearing assembly 62 together for handling as an assembly, without restricting free relative rotation of bearing retainer 70.

Figure 6:
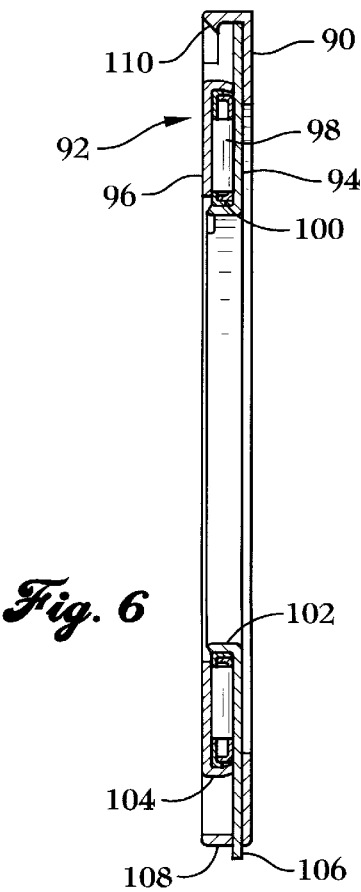
FIG. 6 is a sectional view of the selective washer and thrust bearing assembly of FIG. 5.

FIGS. 5 and 6 illustrate a third embodiment comprising selective washer 90 and thrust bearing assembly 92 having inner race 94, outer race 96, rollers 98 and cage or bearing retainer 100. Axially inwardly extending flanges 102 and 104 of inner and outer races 94 and 96, respectively, with curled portions 105, locate and retain bearing retainer 100 as in the other embodiments. Anti-rotation tab 106 extends from the free edge of the radially directed portion of inner race 94 through a slot or other opening 108 of selective washer 90 to engage a housing (not shown) and to provide retention of selective washer 90 at one circumferential location. Radially inwardly directed lip 110, located diametrically opposite anti-rotation tab 106, has a barb-like configuration to provide a snap-together fit securing the selective washer and thrust bearing assembly together. Alternatively, various flanges, ribs or grooves, positioned about the circumference of selective washer 90 may be used in place of lip 110.

Figure 7:
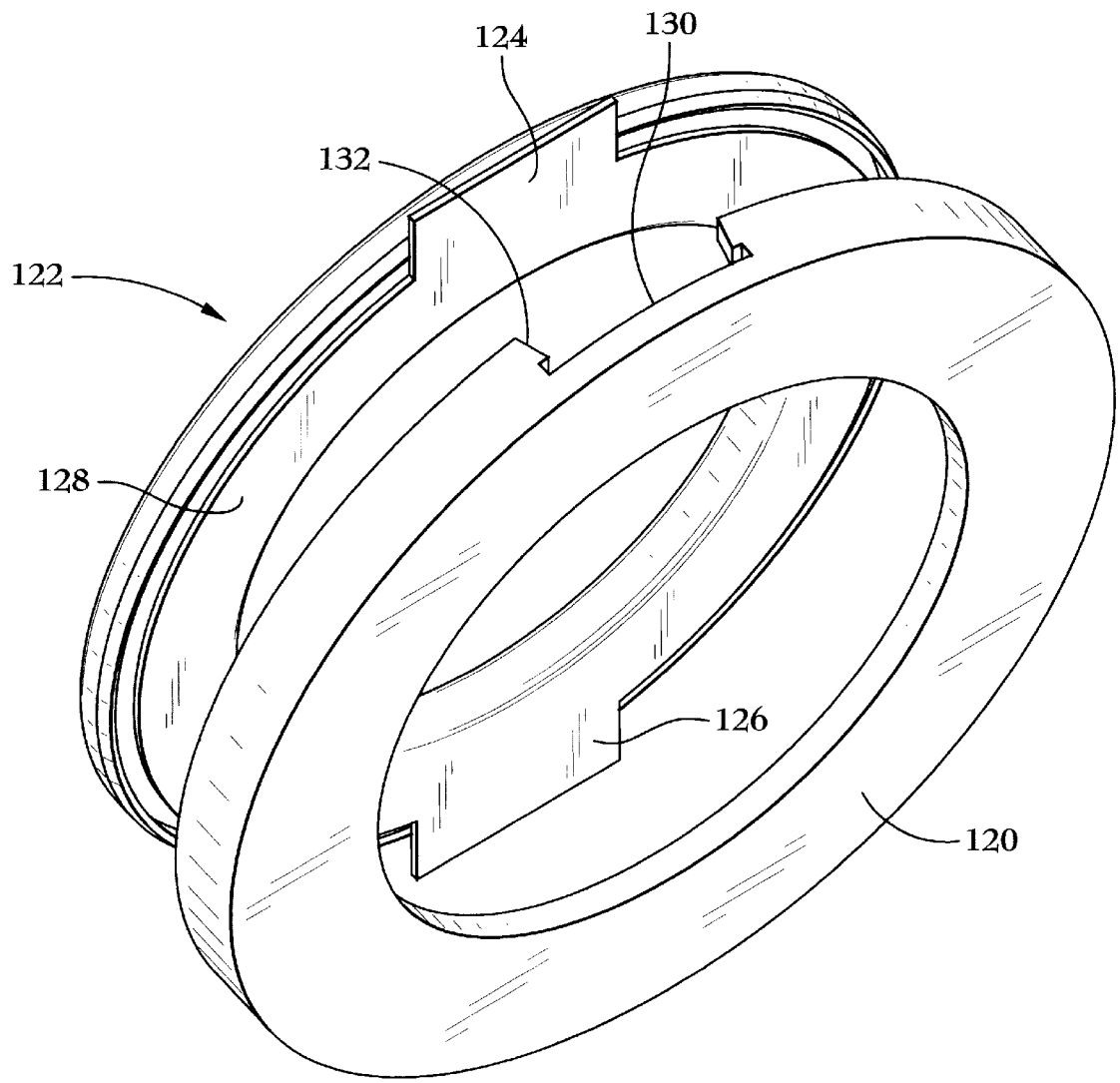
FIG. 7 is a pictorial view of a selective washer and thrust bearing assembly illustrating a fourth embodiment of the present invention prior to mounting of the selective washer.

FIG. 7 illustrates a fourth embodiment of the present invention comprising selective washer 120 and thrust bearing assembly 122 similar to thrust bearing assembly 92 but having two anti-rotation and retention tabs 124 and 126 extending from the free edge of the radially directed portion 128 of the inner race. In this embodiment, openings 130 within selective washer 120 are not slots but have an open configuration with circumferentially extending projections 132 that provide a snap-together fit to retain the selective washer and thrust bearing assembly together. Alternatively, any number of anti-rotation and retention tabs may be used, distributed about the circumference of the inner race or the outer race.

From the above description, it will be apparent that the present invention avoids using a dimpled outer cup as a means of retention, thereby reducing the cost of the bearing assembly and its complexity. Another benefit of this new design is its inherent anti-reversal feature. The thrust bearing assembly cannot be mounted to the selective washer backwards, thereby avoiding the need for an identification mark, such as a colored stripe for example, to ensure proper assembly. Furthermore, the design may incorporate one or more anti-rotation tabs for engaging a housing to prevent rotation of the bearing assembly relative to the housing.

Having described the invention, what is claimed is:

1. A selective washer and thrust bearing assembly comprising:
   an inner race having a radially directed portion with a free outer edge and an axially inwardly extending flange at a radially inner edge;
   an outer race having a radially directed portion with a free inner edge and an axially inwardly extending flange at a radially outer edge;
   rolling elements positioned between the inner race and the outer race, the rolling elements being retained within a bearing retainer;
   retention means on the flanges of the outer race and the inner race to hold the outer and inner races and the bearing retainer together as a thrust bearing assembly; and
   a selective washer positioned over the free edge of one of the outer and inner races, the selective washer being engageable with said one race to retain the selective washer to the thrust bearing assembly.

2. The selective washer and thrust bearing assembly of claim 1 wherein the inner race radially directed portion extends radially outwardly such that the free end is outward of the outer race axially inwardly extending flange, the selective washer being retained by a snap-together fit with the free end.

3. The selective washer and thrust bearing assembly of claim 1 wherein the outer race inwardly directed portion extends radially inwardly such that the free edge is inward of the inner race axially inwardly extending flange, the selective washer being retained by a snap-together fit with the free edge.

4. The selective washer and thrust bearing assembly of claim 1 wherein the selective washer includes a groove for receiving said free edge to provide a snap-together fit to retain the selective washer to the thrust bearing assembly.

5. The selective washer and thrust bearing assembly of claim 1 wherein the selective washer includes a lip with protrusions for engaging said free edge to provide a snap-together fit to retain the selective washer to the thrust bearing assembly.

6. The selective washer and thrust bearing assembly of claim 1 wherein the retention means on at least one of the flanges of the inner and outer races is a lip extending radially toward the bearing retainer to provide a snap-together fit without preventing free rotation of the bearing retainer with respect to the lip.

7. The selective washer and thrust bearing assembly of claim 1, further comprising at least one anti-rotation tab extending radially from the free edge of one of the inner and outer races, each anti-rotation tab projecting through an opening in the selective washer for engagement with a housing to prevent rotation of the selective washer and thrust bearing assembly with respect to the housing.

8. The selective washer and thrust bearing assembly of claim 7 wherein the number of anti-rotation tabs is one and the selective washer includes a protrusion diametrically opposite the anti-rotation tab for providing a mechanical interlock with said free edge to retain the selective washer to the thrust bearing assembly.

9. The selective washer and thrust bearing assembly of claim 8, wherein the number of anti-rotation tabs is at least two and at least one opening receiving an anti-rotation tab includes circumferentially extending projections providing a snap-together fit with the anti-rotation tab.

10. The selective washer and thrust bearing assembly of claim 1, wherein the selective washer is formed of a polymer.

\* \* \* \* \*

UNITED STATES PATENT AND TRADEMARK OFFICE
CERTIFICATE OF CORRECTION

PATENT NO. : 5,967,674
DATED : October 19, 1999
INVENTOR(S) : Leo M. Reubelt, et al.

It is certified that error appears in the above-identified patent and that said Letters Patent is hereby corrected as shown below:

On the title page, item [73] Assignee should read--
The Torrington Company, Torrington, CT --.

Signed and Sealed this

Eighth Day of August, 2000

Attest:

Q. TODD DICKINSON

Attesting Officer

Director of Patents and Trademarks